Patented Oct. 8, 1946

2,409,126

UNITED STATES PATENT OFFICE 2,409,126

SYNTHETIC NITROGENOUS RESINS AND INTERMEDIATES THEREFOR

William O. Kenyon and Delbert D. Reynolds, Rochester, N. Y., assignors to Eastman Kodak Company, Rochester, N. Y., a corporation of New Jersey No Drawing. Application March 20, 1943, Serial No. 479,904

2 Claims. (Cl. 260—83)

This invention relates to synthetic nitrogenous resins and to intermediates therefor.

A number of synthetic nitrogenous resins having in the molecule acid amide groups,

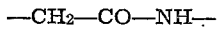

have been prepared in recent years. Such polymeric materials resemble proteins, in a sense, since the acid amide links, or the peptide links, as they are sometimes called, are integral parts of the linear chains and serve as means for combining the fundamental units of the chain to form the linear macromolecule.

We have now found a new kind of synthetic nitrogenous resins which contain acid amide groups and amino acid units. Contrasted with the aforesaid previously known resins, our new resins contain a linear chain of carbon atoms, while the amino acid portions and the acid amide links are present as side chains.

It is, accordingly, an object of our invention to provide new synthetic resins. A further object is to provide a process for preparing such resins. Other objects will become apparent hereinafter.

In accordance with our invention, we first condense a monomeric acrylyl halide, such as acrylic chloride, α-methacrylic chloride or α-ethacrylic chloride, for example, with an ester of an amino acid of the type found in proteins, e. g. esters of glycine, alanine, dl-α-aminophenylacetic acid, dl-α-amino-n-butyric acid, α-amino-isobutyric acid, dl-α-amino-n-caproic acid, dl-α-aminocaprylic acid, dl-α-amino-α-methylbutyric acid, p-aminophenylglycine dihydrochloride, dl-α-amino-n-valeric acid, d-arginine monchydrochloride, l-asparagine, l-aspartic acid, d-glutamic acid and l-histidine dihydrochloride. The condensations are advantageously effected in the presence of an aqueous acid-binding agent, such as a water-soluble alkali, e. g. an alkali metal hydroxide, and in the presence of a water-immiscible organic liquid which is a solvent for the condensation product, i. e. the N-acrylyl amino acid ester. Such water-immiscible organic liquids are chloroform, carbon tetrachloride, benzene, toluene, heptane, etc. The condensations are advantageously effected at below 10° C.

In accordance with the invention, we then polymerize the monomeric N-acrylyl amino acid esters by heating, advantageously in the presence of a polymerization catalyst such as are known to accelerate the polymerization of acrylic or vinyl compounds. Organic peroxides are advantageously employed as polymerization catalysts. Benzoyl peroxide is especially suitable.

Our new monomeric products are N-acrylyl amino acid esters and our new polymeric products are poly N-acrylyl amino acid esters.

The following examples will serve to illustrate our new monomers and polymers and the manner of obtaining the same.

*Example 1.—Polymer of N-(α-methacrylyl)-glycine ethyl ester*

279 g. (2 mol.) of the ethyl ester of glycine hydrochloride were dissolved in 300 cc. of distilled water. 250 cc. of chloroform were added to the aqueous solution, and the resulting mixture was cooled to 1° C. While stirring and cooling to not more than 6° C., 165 cc. of an aqueous solution of sodium hydroxide containing 80 g. (2 mol.) of the alkali were slowly added to the mixture. To the resulting mixture, while stirring and cooling below 10° C., were added slowly 104 g. (1 mol.) of α-methacrylyl chloride. 82 cc. of aqueous sodium hydroxide solution containing 40 g. of alkali were then added slowly while cooling to 10° C. or less. Additional α-methacrylyl chloride was then added slowly until lack of tendency for a temperature rise indicated no further reaction. 41 cc. of aqueous sodium hydroxide (20 g. NaOH) were then added with cooling to 10° C. α-Methacrylyl chloride was then introduced until no further temperature rise was noted. 20 cc. of sodium hydroxide solution (10 g. NaOH) were added, followed by additional α-methacrylyl chloride, until no further temperature rise was observed. A total of 150 g. of sodium hydroxide and 209 g. of α-methacrylyl chloride were thus employed. The mixture was stirred at 10° C. for six hours and then was allowed to stand for eight hours at 20° to 25° C. The chloroform layer was removed, washed with water and dried over anhydrous sodium sulfate. The chloroform was then removed by evaporation in a stream of air at 20° to 25° C. There remains a viscous syrup, consisting of monomeric N-(α-methacrylyl)-glycine ethyl ester mixed with some polymeric N-(α-methacrylyl)-glycine ethyl ester. The viscous syrup was dissolved in 50 cc. of 1,4-dioxane and 0.5 g. of benzoyl peroxide were added. The resulting solution was heated on a steam bath for one hour and 20 minutes. At the end of this time, a clear non-flowable mass of polymer had formed. This mass of polymer was heated at 50° C. for 60 hours. The polymer was then dispersed in acetone and the acetone dispersion poured into water to precipitate the polymer. The precipitated polymer was dried in the air. It contained 7.54 percent by weight of nitrogen (calculated, 8.2 percent.)

*Example 2.— N-(α-methacrylyl)-alanine ethyl ester*

100 grams of the ethyl ester of alanine hydrochloride were dissolved in 100 cc. of water. 100 cc. of chloroform were added and the mixture was stirred continuously and cooled to −3° C. A cool solution of 26.2 grams of sodium hydroxide in 100 cc. of water were then added. 68.2 grams of methacrylyl chloride were placed in a separatory funnel and this compound was added slowly and with stirring to the solution of amino acid at such a rate that the temperature of the solution was kept below 3° C. When about ½ of the acid chloride had been introduced, no further tendency to temperature rise was noticed. A solution of 13.1 grams of sodium hydroxide in 50 cc. of water were then added and methacrylyl chloride was introduced until no further tendency to temperature rise was noticed. A solution of 6.5 grams of sodium hydroxide in 25 cc. of water were then added followed by methacrylyl chloride until no further apparent reaction occurred. 12 cc. of sodium hydroxide solution containing 3.4 grams of sodium hydroxide were then added followed by the remainder of the methacrylyl chloride. The resulting solution was refrigerated overnight, then the chloroform layer was separated, washed with distilled water, and dried over anhydrous sodium sulfate. After evaporation of the chloroform, 50 cc. of dioxane and 0.2 gram of benzoyl peroxide were added to the residue. The solution was then placed on the steam bath and polymerization started in a short time. After polymerization for 18 hours, the polymer was redispersed in additional dioxane, precipitated in distilled water, and purified by twice dissolving in acetone and reprecipitating in water. After drying, 65 grams of a white, hard resin were obtained which contained 6.96 percent of combined nitrogen as compared with the calculated nitrogen content of 7.5 for poly (N-methacrylyl alanine ethyl ester).

*Example 3.—N-(α-methacrylyl)-dl-α-aminophenylacetic acid ethyl ester*

84.5 grams of the ethyl ester of dl-α-aminophenylacetic acid hydrochloride were dissolved in 250 cc. of water. 250 cc. of chloroform were added, the solution was cooled to −2° C., and a solution of 15.7 grams of sodium hydroxide in 50 cc. of water were added. The solution was stirred and methacrylyl chloride was added until no further tendency toward temperature rise was noted. 25 cc. of aqueous sodium hydroxide containing 7.8 grams of alkali were added followed by additional methacrylyl chloride until no further reaction occurred as indicated by lack of tendency for temperature rise to occur. A total of 41 grams of methacrylyl chloride were thus added. The mixture was stirred for three hours, then the chloroform layer was separated, washed, dried over anhydrous sodium sulfate, and decolorized with charcoal. When this solution was concentrated by evaporation of the chloroform, the desired methacrylyl derivative crystallized. 60 grams of the ethyl ester of N-methacrylyl dl-α-aminophenylacetic acid, melting at 74° C. to 76° C. were obtained. Analysis showed a nitrogen content of 5.79 and the calculated nitrogen content of the above-mentioned compound is 5.67 percent. 10 grams of this product were dissolved in 30 cc. of dioxane. 50 mg. of benzoyl peroxide catalyst were added and the solution was heated on the steam bath for about 16 hours. The polymer was separated from the thick viscous dope by precipitation in distilled water. The precipitated polymer was dispersed in acetone and again precipitated in water and then dried at 120° C. A white polymer was obtained which contained 5.8 percent of combined nitrogen. The calculated nitrogen content for the polymer was 5.67 percent.

Our N-acrylylamino acid esters can be copolymerized with other unsaturated polymerizable organic compound. The following examples will serve to illustrate such copolymers.

*Example 4.—Copolymer of N-(α-methacrylyl)-dl-α-aminophenyl acetic ethyl ester and methyl α-methacrylate*

5 g. of N-(α-methacrylyl)-dl-α-aminophenyl acetic ethyl ester, 2.03 g. of methyl α-methacrylate, 20 g. of 1,4-dioxane and 0.37 g. of benzoyl peroxide were heated together on a steam bath for 4 days. The viscous reaction mixture was poured into distilled water to precipitate the copolymer. The precipitated copolymer was dissolved in acetone and the acetone solution poured into distilled water to precipitate the copolymer. The copolymer was dried in the air. It contained 3.3 percent by weight of nitrogen.

*Example 5.—Copolymer of N-(α-methacrylyl)-dl-α-aminophenyl acetic ethyl ester and methyl acrylate*

5 g. of N-(α-methacrylyl)-dl-α-aminophenyl acetic ethyl ester, 1.74 g. of methyl acrylate, 0.035 g. of benzoyl peroxide and 20 cc. of 1,4-dioxane were heated together on a steam bath for 4 days. The copolymer was isolated as in Example 4. It contained 4.27 percent by weight of nitrogen.

*Example 6.—Copolymer of N-(α-methacrylyl)-dl-α-aminophenyl acetic ethyl ester and vinyl acetate*

5 g. of N-(α-methacrylyl)-dl-α-aminophenyl acetic ethyl ester, 17.4 g. of vinyl acetate, 20 cc. of 1,4-dioxane and 0.035 g. of benzoyl peroxide were heated together on a steam bath for 4 days. The copolymer was isolated as in Example 4. It contained 4.54 percent by weight of nitrogen.

*Example 7.—Copolymer of N-(α-methacrylyl)-dl-α-aminophenyl acetic ethyl ester and methyl isopropenyl ketone*

5 g. of N-(α-methacrylyl)-dl-α-aminophenyl acetic ethyl ester, 1.7 g. of isopropenyl methyl ketone, 20 cc. of 1,4-dioxane and 0.035 g. of benzoyl peroxide were heated together on a steam bath for 4 days. The copolymer was isolated as in Example 4. It contained 4.39 percent by weight of nitrogen.

*Example 8.—Copolymer of N-(α-methacrylyl)-dl-α-aminophenyl acetic ethyl ester and α-methacrylic acid*

5 g. of N-(α-methacrylyl)-dl-α-aminophenyl acetic ethyl ester, 1.74 g. of α-methacrylic acid, 20 cc. of 1,4-dioxane and 0.035 g. of benzoyl peroxide were heated together on a steam bath for 4 days. The copolymer was isolated as in Example 4. It contained 4.32 percent by weight of nitrogen.

The polymers set forth in the above examples are soluble in either acetone or alcohol containing a small amount of water and the solutions in acetone or alcohol can be diluted with water up to approximately 50 percent before precipitation of the polymer begins. These substances may be dispersed in a suitable solvent and coated out on plates to form film sheets or foils, or the solutions may be spun into threads. Such materials because of their susceptibility to water may also be used as gelatin substitutes for such purposes as backings for photographic films, overcoatings for photographic films, as gelatin substitutes in the preparation of photographic emulsions, as dispersing agents for silver halides, as undercoatings between the support and emulsion layers of photographic films, as sizing for papers, textiles, etc. Coatings of our new resins may be hardened or insolubilized if desired by known hardening agents for gelatine, e. g., formaldehyde.

What we claim as our invention and desire to be secured by Letters Patent of the United States is:

1. N-($\alpha$-methacrylyl)-dl-$\alpha$-aminophenylacetic acid ethyl ester.
2. Polymerized N-($\alpha$-methacrylyl)-dl-$\alpha$-aminophenyl acetic acid ethyl ester.

WILLIAM O. KENYON.
DELBERT D. REYNOLDS.